United States Patent
Cherkauer et al.

(10) Patent No.: US 7,406,485 B2
(45) Date of Patent: Jul. 29, 2008

(54) SHARED SCANS UTILIZING QUERY MONITOR DURING QUERY EXECUTION TO IMPROVE BUFFER CACHE UTILIZATION ACROSS MULTI-STREAM QUERY ENVIRONMENTS

(75) Inventors: Kevin James Cherkauer, Portland, OR (US); Scott David Lashley, Portland, OR (US); Jason Christopher Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/846,161

(22) Filed: Aug. 28, 2007

(65) Prior Publication Data
US 2007/0294219 A1    Dec. 20, 2007

Related U.S. Application Data

(63) Continuation of application No. 10/763,752, filed on Jan. 22, 2004, now Pat. No. 7,349,925.

(51) Int. Cl.
*G06F 17/30*     (2006.01)
(52) U.S. Cl. ............................. 707/200; 707/3; 707/100
(58) Field of Classification Search .................. 707/1–5, 707/100, 104.1, 200–205
See application file for complete search history.

(56) References Cited

U.S. PATENT DOCUMENTS

| | | | | |
|---|---|---|---|---|
| 5,758,146 | A  * | 5/1998 | Schiefer et al. ................. | 707/2 |
| 5,794,229 | A  * | 8/1998 | French et al. ................... | 707/2 |
| 5,832,508 | A  * | 11/1998 | Sherman et al. ............. | 707/200 |
| 6,470,330 | B1 * | 10/2002 | Das et al. ........................ | 707/2 |

* cited by examiner

*Primary Examiner*—Cheryl Lewis
(74) *Attorney, Agent, or Firm*—Robert O. Guillot; Intellectual Property Law Offices

(57) ABSTRACT

A system for data base management using memory devices holding a database containing tables of data occupying extents. A database engine reviews each query to determine an extents list of extents containing the data needed by that said query. A query monitor then re-orders the extents lists so that extents are retrieved and stored in a buffer cache for more efficient use when executing the queries. The database engine retrieves needed extents from the memory devices, as ordered in the extents lists, and stores those extents in the buffer cache. The database engine then executes one or more queries on the data in the extents in the buffer cache to determine respective results.

13 Claims, 6 Drawing Sheets

SHARED SCANS UTILIZING QUERY MONITOR DURING QUERY EXECUTION TO IMPROVE BUFFER CACHE UTILIZATION ACROSS MULTI-STREAM QUERY ENVIRONMENTS

BACKGROUND OF THE INVENTION

1. Field of the Invention

The present invention relates to data processing apparatus and corresponding methods for the retrieval of data stored in a database or as computer files. More particularly, the invention relates to database or file accessing.

2. Description of the Prior Art

Individuals and organizations are increasingly storing data electronically in databases, a collection of the data arranged for ease of storage, retrieval, updating, searching and sorting by computerized means. As the size, number, and complexity of such databases is growing, sophisticated Data Base Management Systems (DBMS) are continually being developed and improved to facilitate database use and management. In a modern DBMS the data may be stored at multiple, non-contiguous locations within one storage volume, or spanned across multiple volumes. Such a DBMS may also be used for multiple purposes, often by multiple users, effectively concurrently.

FIG. 1 (background art) is a block diagram conceptually depicting the basic elements and operation of a DBMS 10 that are most relevant to the problem this invention addresses. For present purposes it is a given that data has been pre-stored in a database 12. A database engine 14 communicates with the database 12 to retrieve and work with the data, and in the course of its work the database engine 14 employs a buffer cache 16. In operation, a query 18 is provided to the database engine 14. The database engine 14 then directs retrieval of the data the query 18 will work with from the database 12 and its storage, all or in part, in the buffer cache 16. The database engine 14 then operates on the data in the buffer cache 16, directing additional data retrieval and storage in the buffer cache 16 if necessary, until processing of the query 18 is complete and a result 20 is arrived at.

FIG. 2 (background art) is a block diagram conceptually depicting the contents of the database 12 of FIG. 1. Specifically, these contents are tables 22, 24, 26. In actual practice, a database may contain a lesser or greater number of tables than is shown in FIG. 2, and databases typically contain many more.

FIG. 3 (background art) is a block diagram conceptually depicting the contents of a table, say, table 26 of FIG. 2. Here it can be seen that table 26 contains a plurality of elements of data 28 stored in a plurality of rows 30. The data 28 in the rows 30 is often referenced by columns 32, and FIG. 3 shows four columns labeled C1, C2, C3, C4. In actual practice, a table may contain a lesser or greater number of rows and columns than are shown in FIG. 3, and it is not unusual for tables to contain tens of columns and thousands of rows. FIG. 3 shows an optimal situation where the table 26 is stored contiguously. In actual practice, constraints often exist that do not permit this.

FIG. 4 (background art) is a block diagram conceptually depicting the contents of table 26 again, now grouped into pages 34 in an extent 36. Data processing systems, including DBMSs and their sub-systems, have limits on the quantity of data they can handle at once. There always is an ultimate limit, and this and other considerations usually motivates selection of a lesser quantity of memory termed a "page" that the system works with. Particularly with respect to moving data into and out of memory, such as the buffer cache 16 in our example here, data is often spoken of as being paged into and paged out of memory. The pages 34 in FIG. 4 are simplified examples containing only three rows of data each. An extent 36 is a set of physically contiguous pages 34 of a table, and the table then consists of a set of such extents 36.

FIG. 5 (background art) is a block diagram conceptually depicting a common situation in a large database, say, database 12 of FIG. 1-2. The totality of the database 12 in our example here thus resides in three disk drives 38, 40, 42. The tables 22, 24, 26 are still stored in the database 12, but it now can be seen that they are stored as extents 36 in the various disk drives 38, 40, 42. In FIG. 5 the tables and extents are represented by the notation: Table_id.Extent_id. For instance, T1.E4=the 4th extent of table T1. Thus, a simple query like "select * from T2" on execution would turn into something like: Scan T2.E1, ..., T2.E7.

As the DBMS has grown in importance and use, it has become increasingly desirable to optimize performance. Many approaches have been tried, most of which are not germane here. Of present interest, however, is optimizing the processing of queries, i.e., the scanning of particular sub-sets of the stored data. For this, the data that is needed by a query, i.e., its extents, is copied into the buffer cache. Unfortunately, many factors can combine to complicate performing efficient data scans across query extents in this overall arrangement.

Even after optimization in other respects, some queries may need to access hundreds of extents, performing full data scans across those. If there are multiple queries being executed, it is quite possible that those queries will access much of the same data. However, as matters exist now, the ability to share that data is largely arbitrary. Depending on the order of the list of extents for data brought into the buffer cache for a given query and when other queries start, the ability to share the cached data for multiple scans is thus based on luck.

Some database engines today separate each extent into a separate thread, such that each thread is responsible for scanning only one extent and returns the results to a join/merge operator which aggregates the results. But in a system with limited resources where starting that many threads would consume the available resources, a thread may be given a whole list of extents to operate on. For our purposes here, we will assume that a single thread is given the list of extents to scan, and rather than speak in terms of "threads" we will herein use the word "scan" to better represent a list of extents to be operated on.

Let us consider a simple hypothetical case using a query Q1 that uses an extent E1, a Q2 that uses an E2, and a Q3 that uses an E3, wherein E3 is a subset of E1. If E2 is large enough that it "pushes" relevant parts of E1 out of the buffer cache, it follows that Q1, Q2, Q3 is not an efficient ordering of query execution. Generalizing, if two or more scans are active and share a large set of the extents required to satisfy their respective queries and have no coordination between them, buffer cache thrashing can take place where pages of one scan replace pages of the other scan within the buffer cache. This causes increased I/O as well as slowing overall query processing.

Alternately, let us consider a case with queries Q1 through Q25, respectively using extents E1 through E25, wherein E1 and E25 are the same. Running Q1 and Q25 separately is not efficient. Attempting to get "multi-streaming" by utilizing very large buffer pools is an option, but not a viable one in most cases. Buffer cache has inherent "costs" that weigh against unduly increasing its amount, e.g., components cost, power usage, physical footprint, etc. It is also usually desirable for a DBMS to free up available memory resources for other operations, like sorts and hash joins.

The attempts to date to improve DBMS performance have largely involved optimizing queries for execution. For example, Pat. App. U.S. Pat. No. 6,691,101 by MacNicol et al. discloses a "Database System Providing Optimization Of A Group By An Operator Over A Union All." It describes a database system providing methods for optimization and execution of queries aggregating information from multiple database tables. The method here breaks serial operations into a group of child operations that can be individually optimized and processed in parallel. A query including a grouping operator over a union node is split by pushing the grouping operation down into each input arm of the union node. Specifically, grouping operators are inserted into each child arm of qualifying union nodes, enabling separate physical database tables to be summarized in parallel. Each of the child grouping operators concurrently groups data and generates summary results in parallel, taking advantage of capabilities of available parallel processing hardware. The aggregate operators of the original master grouping operator are modified to accept and correctly synthesize sub-aggregated results generated by each of the child grouping operators. The method here also enables individual optimization of operations on each database table, including use of index-only execution plans.

As such, this reference provides background on the problem and teaches one approach that has been tried, but that approach does not include a runtime component to query execution that monitors extent scans across all queries being executed and allows the re-ordering of the extents list for each query so that queries accessing same extents will have a much higher chance of finding the data they need in the buffer cache.

U.S. Pat. Nos. 5,813,005 and 6,510,428 by Tsuchida et al. both titled "Method And System Of Database Divisional Management For Parallel Database System" and U.S. Pat. No. 5,761,696 by Giordano, et al. discloses a "Parallel Database Serving Mechanism For A Single-Level-Store Computer System" teach parallel approaches. The former references teach parallel processing on multiple platforms with just one I/O server, thus teaching a approach for use in some limited hardware configurations. However, this does not include a runtime component to ensure a much higher chance of finding needed data in buffer cache. The latter reference teaches cross-address space mapping of query results, thus addressing matters after extents are loaded into cache.

It is, therefore, an object of the present invention to provide an improved system for managing buffer cache in a DBMS. Other objects and advantages will become apparent from the following disclosure.

SUMMARY OF THE INVENTION

Briefly, a first preferred embodiment of the present invention is a system for data base management. At least one memory device is provided to hold a database having a plurality of tables of data, wherein each table can occupy at least one extent. A buffer cache is provided to store a plurality of the extents. A database engine is provided to process multiple queries with respect to particular data by reviewing each query to determine a respective extents list of the extents containing the particular data needed by that query. A database engine retrieves the extents from the memory devices as ordered in the extents lists, storing those extents that are retrieved in the buffer cache, and then executes the queries on the particular data in the respective extents stored in the buffer cache to determine respective results. A query monitor is provided to re-order the extents lists so that the extents that are retrieved and stored in the buffer cache are used more efficiently by the queries.

Briefly, a second preferred embodiment of the present invention is a method for data base management. A database having a tables of data, wherein each table occupies at least one extent is stored. Multiple queries with respect to particular data are received. Each query is reviewed to determine a respective extents list of the extents containing the particular data needed by that query. The extents lists are re-ordered based on an order calculated to be more efficient for execution of the queries. The extents are retrieved as ordered in the extents lists and stored in a buffer cache. The queries are then executed on the particular data in the respective extents stored in the buffer cache to determine respective results.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
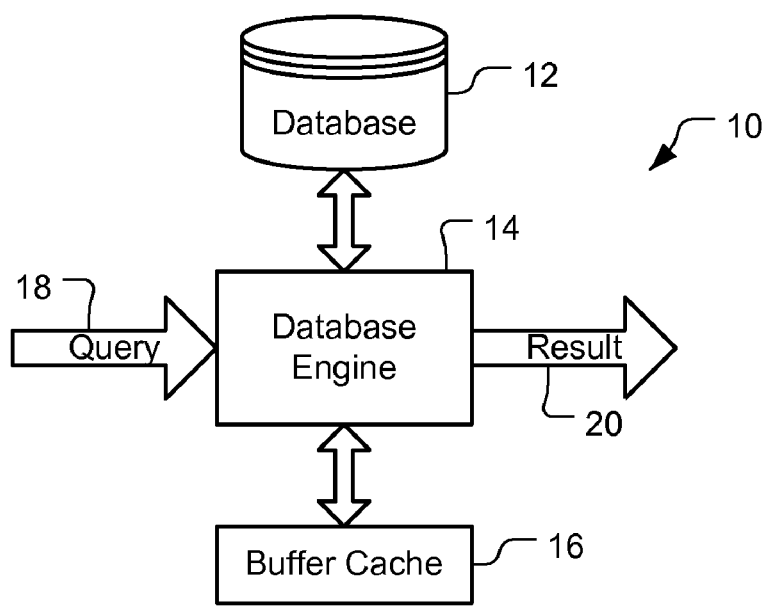
FIG. 1 (background art) is a block diagram conceptually depicting the basic elements and operation of a Data Base Management System (DBMS) that are particularly relevant to the problem the present invention addresses.

The present invention provides methods and apparatus to utilize a query monitor during query execution to improve buffer cache utilization by sharing scans in multi-stream query environments. As illustrated in the various drawings herein, and particularly in the view of FIG. 6, these embodiments of the invention are depicted by the general reference characters 100 and 150.

Figure 6:
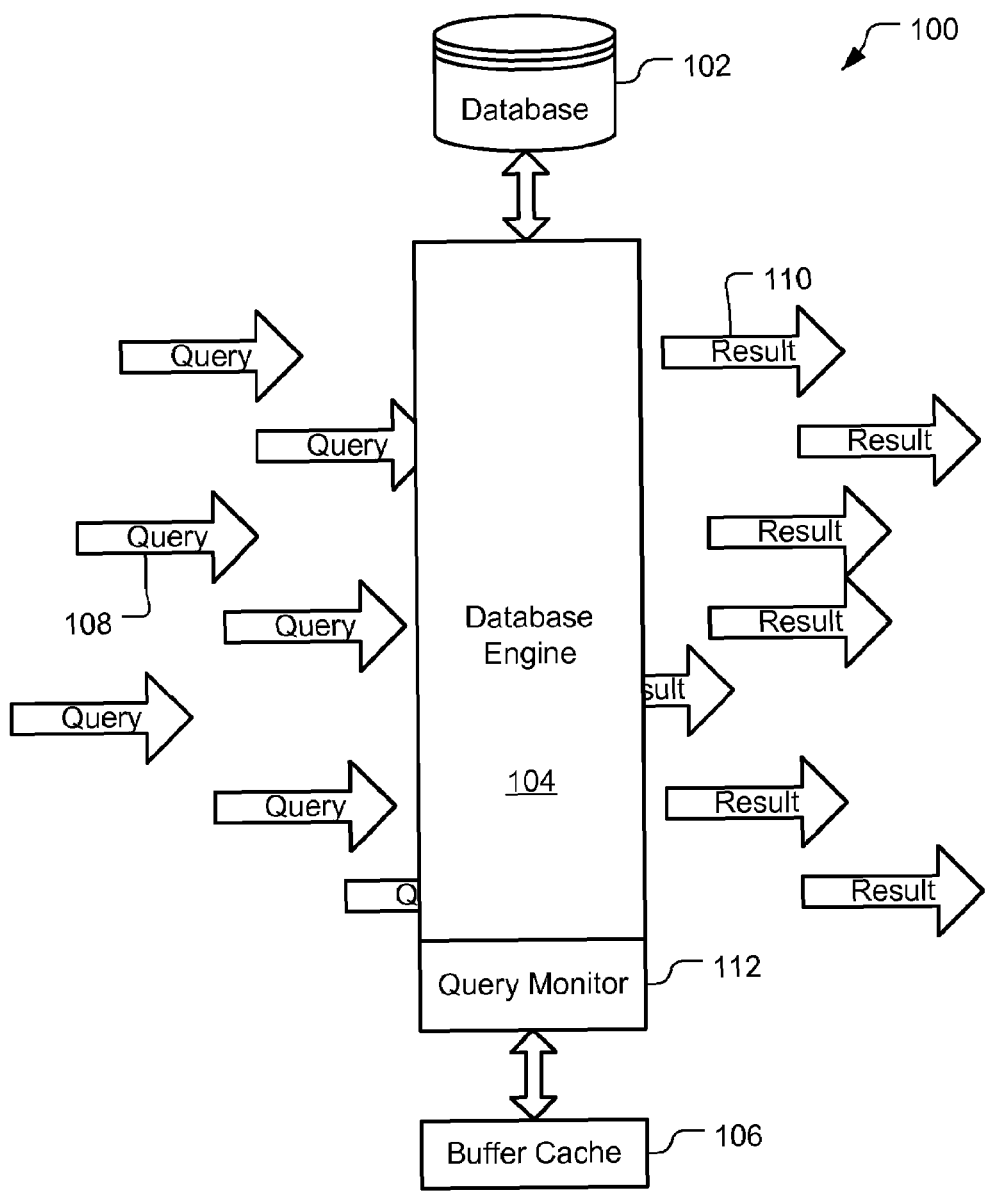
FIG. 6 is a schematic block diagram depicting an exemplary DBMS in accord with the present invention.

FIG. 6 is a schematic block diagram depicting an exemplary Data Base Management Systems (DBMS 100) in accord with the present invention. The DBMS 100 includes a database 102 in which data has been pre-stored. A database engine 104 communicates with the database 102 to retrieve and work with the data, and in the course of this employs a buffer cache 106. In operation, a plurality of queries 108 are provided to the database engine 104 to obtain respective results 110.

Up to this point the DBMS 100 resembles the previously discussed DBMS 10 (FIG. 1) in structure and even somewhat in operation. There are, however, two notable differences. First, the exemplary DBMS 10, and particularly the database 12, were highly simplified to convey basic principles. In actual practice, a database is usually much more complex and pluralities of queries are processed into results, with the queries arriving at different times and requiring data in extents from the database that is all or only partially different. FIG. 6 stylistically represents this situation with the pluralities of queries 108 and results 110 shown, and is therefore more representative of the problems this invention addresses.

In one important respect, however, the simple DBMS 10 well represents the state of the art in an important respect. The database engine 14 and database engines today, generally, are suitable for little more than one-query-in begets one-result-out processing, yet still pressed to serve in complex, multi-query environments.

The second way the DBMS 100 particularly differs from the DBMS 10 of FIG. 1, and from all other art known to the present inventors, is in the database engine 104. The database engine 104 here includes a query monitor 112 to monitor extent scans across all queries being executed in the database engine 104 and to re-order the list of extents for each query 108 so that all of the queries 108 accessing a same extent or extents have a much higher chance of finding the data they need in the buffer cache 106.

Figure 2:
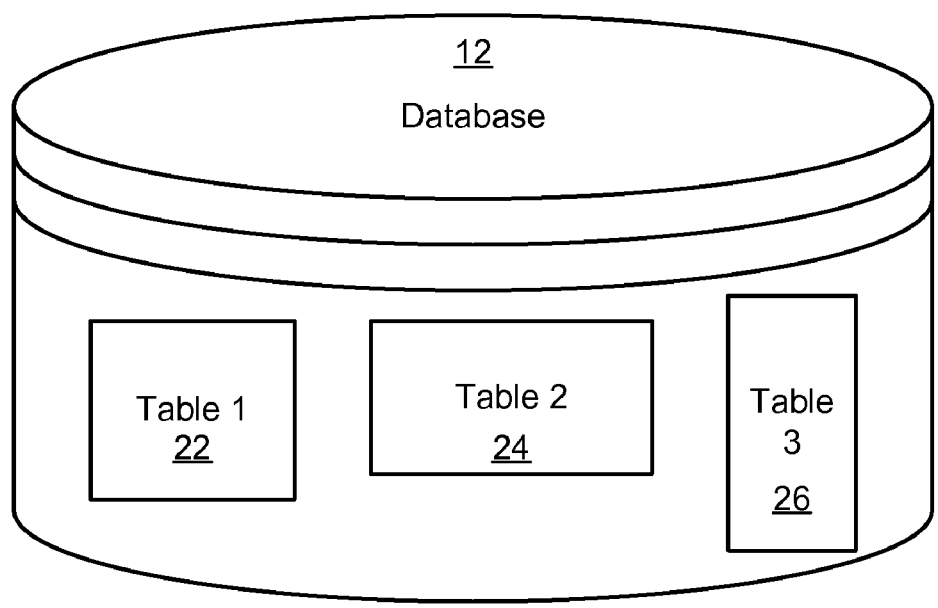
FIG. 2 (background art) is a block diagram conceptually depicting the contents of the database of FIG. 1.
Figures 3, 4:
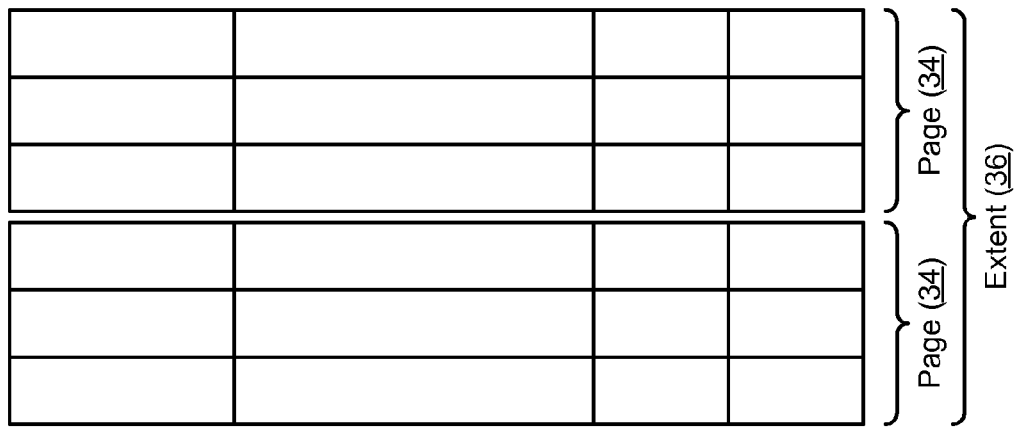
FIG. 3 (background art) is a block diagram conceptually depicting the contents of a table of FIG. 2.
FIG. 4 (background art) is a block diagram conceptually depicting the contents of the table of FIG. 3 again, now grouped into pages in an extent.
Figure 5:
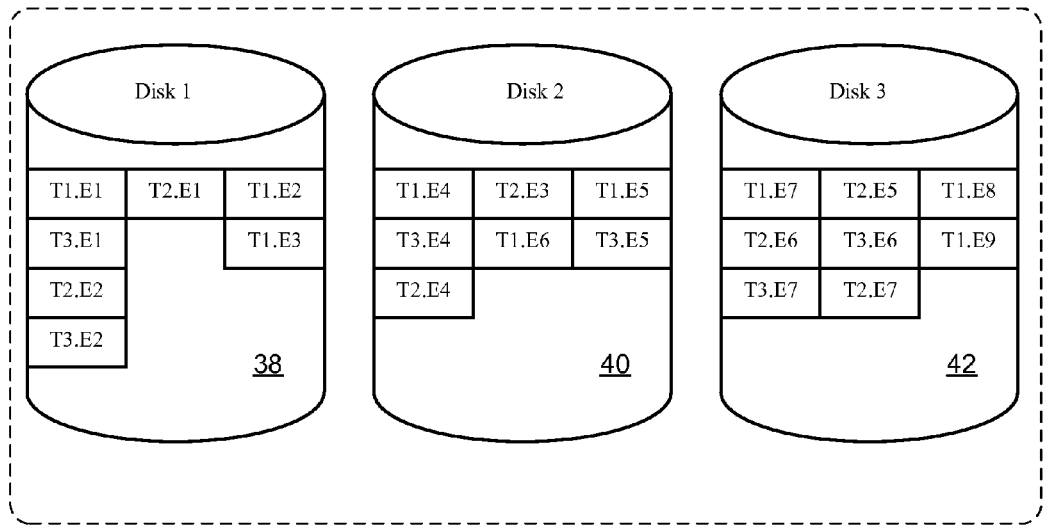
FIG. 5 (background art) is a block diagram conceptually depicting a common situation in a large database.
Figure 7:
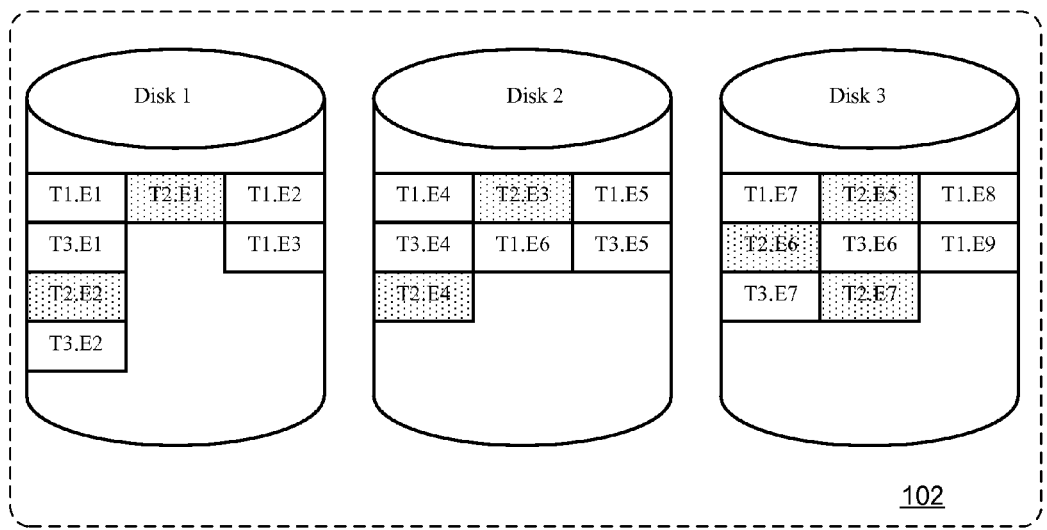
FIG. 7 is a block diagram conceptually depicting the database of FIG. 6, for use in an example of query processing.

With reference also to FIG. 1-5 for background, FIG. 7 is a block diagram conceptually depicting the database 102 (essentially the simple database 12 of FIG. 1-2 again), for consideration of an example of query processing. In Decision Support Systems (DSS) environments, for instance, different queries 108 will often scan the same data, but looking for different results 110. DSS systems are mainly read-only DBMSs which use batch processing to update data and tend to require 100's if not 1000's of rows to answer queries. OLTP (On Line Transaction Processing) systems are systems where updates are done via 1000's of transactions at arbitrary times by a variety of sources and transactions here tend to require 10's of rows to process the transaction. In the past, DSS and OLTP DBMSs tended to be separated, often unloading the data from the OLTP DBMS into the DSS DBMS for query crunching. Today, however, the same DBMS may service both OLTP and DSS workloads simultaneously.

Continuing, two such queries 108 for a DSS thus might be:

Q1: Select sum(c1) from T2 where c2>=100;

Q2: Select avg(c3) from T2 where c4<1000;

If table 24 (FIG. 2; T2 in FIGS. 5 and 7) does not have an index on the c2 or c4 columns 32 (FIG. 3), then both of these queries 108 will scan all of table 24 (T2) in order to produce correct results. In particular, this means that both of these queries 108 (Q1 and Q2) will scan the extents 36 emphasized in FIG. 7. Both queries 108 will produce a list of extents 36 to be scanned that might look like this: Scan (T2.E1, T2.E2, T2.E3, T2.E4, T2.E5, T2.E6, T2.E7).

This list is given to the query monitor 112 and a query 108 (say, Q1) is executed. As the query 108 (Q1) is executed, the progress of its scan, scan 1, is monitored to know which extent 36 is currently being scanned. When a new scan, scan 2, comes in (say, for Q2), the query monitor 112 determines if the scans overlap on the same data, and if so, it reorders the list of extents 36 such that scan 2 will start on the extent 36 currently being scanned by scan 1. This allows scan 2 to utilize the buffer cache 106 still being populated by scan 1.

For instance, for scan 1 a list of extents 36 will have been returned from the query monitor 112: Scan (T2.E1, T2.E2, T2.E3, T2.E4, T2.E5, T2.E6, T2.E7). If scan 1 is now in the middle of scanning T2.E4, for scan 2 the query monitor 112 can now return a list of extents 36: Scan (T2.E4, T2.E5, T2.E6, T2.E7, T2.E1, T2.E2, T2.E3).

Figure 8:
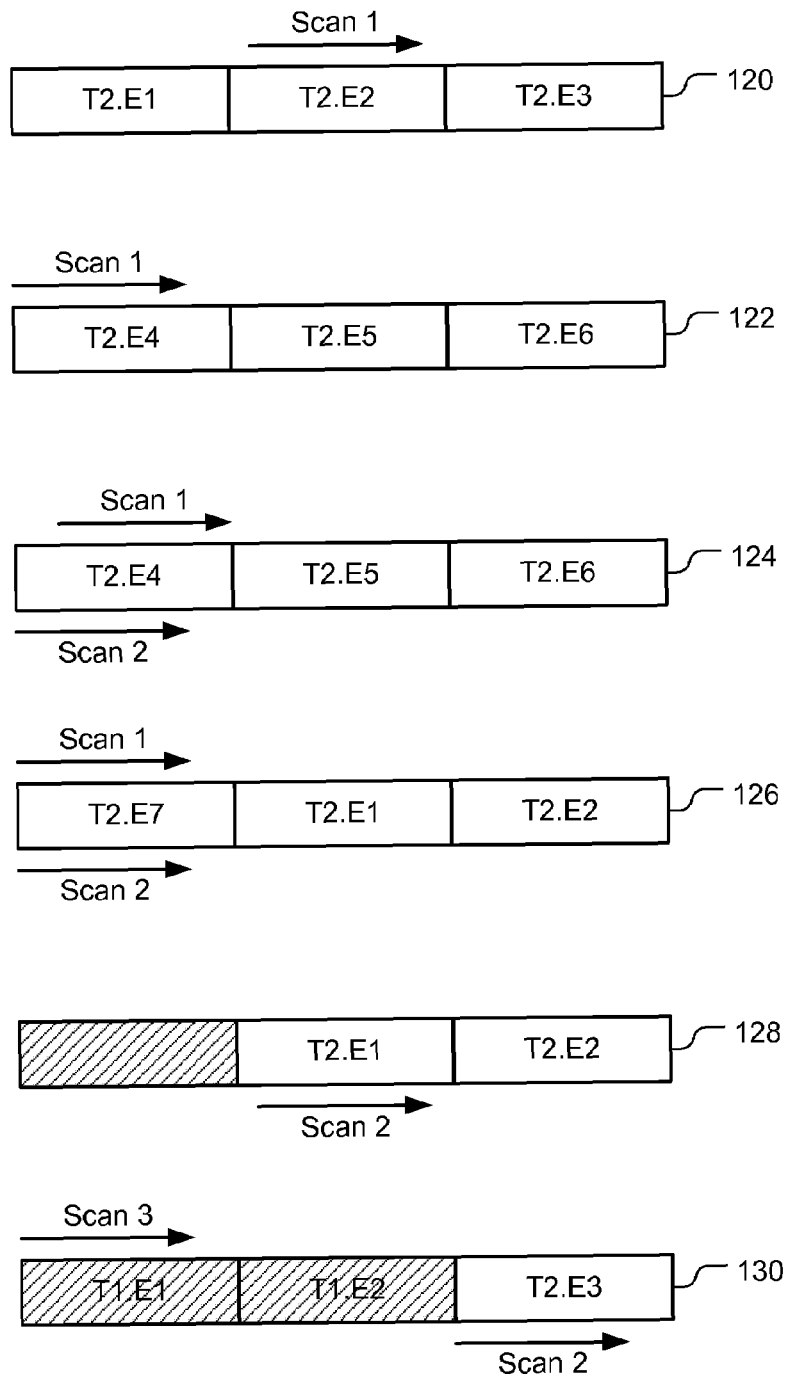
FIG. 8 is a block diagram conceptually depicting the contents of the buffer cache of FIG. 6.

FIG. 8 is a block diagram conceptually depicting the contents of the buffer cache 106. For simplicity, the buffer cache 106 has been selected here to have a capacity to hold only three extents 36 from table 24 (T2) at any given time.

At a stage 120, the buffer cache 106 has been loaded with T2.E1, T2.E2, T2.E3 and only scan 1 is progressing. At a stage 122, scan 1 has finished with T2.E1, T2.E2, T2.E3; these have been removed from the buffer cache 106 and replaced with T2.E4, T2.E5, T2.E6; scan 1 is progressing on T2.E4; and the query monitor 112 is aware of this. At a stage 124, the query monitor 112 returns the extent list above for scan 2, and scan 1 and scan 2 then progress until they are finished with T2.E4, T2.E5, T2.E6. At a stage 126, T2.E4, T2.E5, T2.E6 have been replaced in the buffer cache 106 with T2.E7, T2.E1, T2.E2, and both scan 1 and scan 2 progress until scan 1 finishes with T2.E7. At a stage 128, only scan 2 continues and progresses until it finishes with T2.E1, T2.E2. Hatching is used here to show that the leftmost block of the buffer cache 106 is available, since both scan 1 and scan 2 are finished with it. At a stage 130, one of T2.E7, T2.E1, T2.E2, say, T2.E7, has been replaced with T2.E3, and scan 2 continues and progresses until it finishes with T2.E3. Presumably a scan 3 can now also be progressing on T2.E1, T2.E2 or on other data that has replaced it (e.g., T1.E1 and T1.E2 in FIG. 8, emphasized with hatching).

The invention can be embodied as above by separating the I/O processing from the query processing. That is, by having a separate thread for I/O processing that is responsible for using the extent list to populate the buffer cache and a separate thread for the query processing that is responsible for converting pages into rows and then processing the row.

More sophisticated approaches to buffer cache replacement may also be used but then will be more complicated, although not necessarily in a manner that will affect the DBMS 100. For example, at stage 122, scan 1 can be finished with T2.E1, T2.E2, T2.E3 and be currently working on T2.E4. What is contained in the buffer cache in this approach is the already scanned T2.E2 and T2.E3 and a partial extent containing what has so far been paged in of T2.E4 by scan 1. The scan itself, as it progresses through the extents, can thus page in the new extents as read off of the disk and as needed.

In this rendering, the I/O processing would be done and waiting on the query processing to use the populated buffer cache. The present invention is particularly geared toward the I/O processing, to make sure the pages are populated in the buffer cache for the query. And if another query requiring the same extents is requested, then the I/O processing of scan 2 needs to coordinate with the I/O processing of scan 1.

Figure 9:
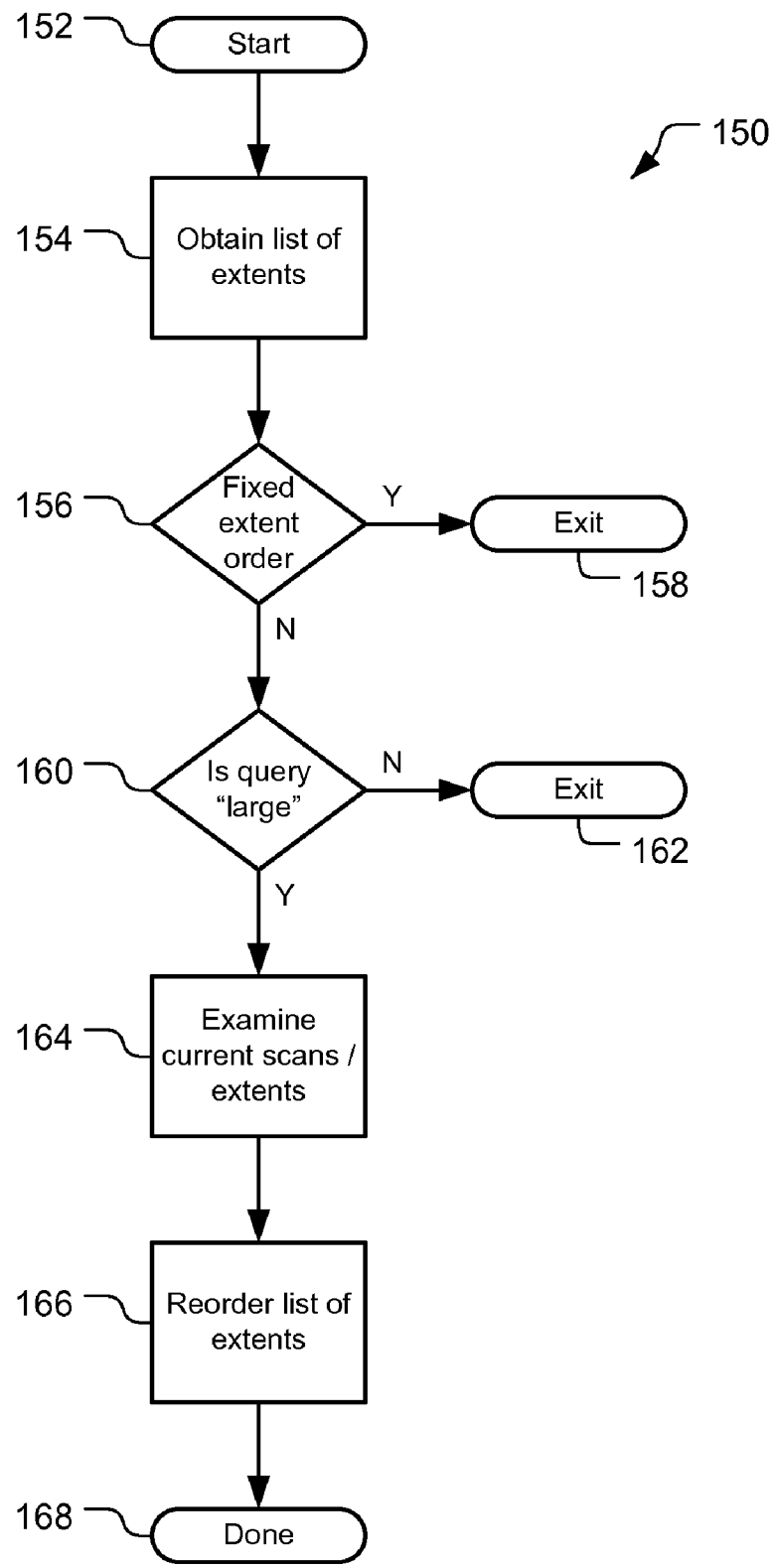
FIG. 9 is a flow chart depicting the major steps in a process according to the present invention.

FIG. 9 is a flow chart depicting the major steps in a process 150 according to the present invention. In a step 152, the process 150 starts. Typical initial operations have already been completed, for instance, any other desired query optimizations.

In a step 154, a list of extents to be read is obtained.

In a step 156, a determination is made whether the present query is utilizing a particular access method indicating that the order of the extents is important (implying that the order of the data within the extents is important). If so, in a step 158 this process 150 is exited and the database engine processes the query and its extents in conventional manner. If this is not the case, however, the order in which the extents is read is deemed to be arbitrary, and this process 150 continues as follows.

In a step 160, a determination is made whether the present query is deemed to be "large" (i.e., having large extents; which any prior action by an optimizer, the size of the list of extents, etc., should be able to determine). If this is not the case, in a step 162 this process 150 is exited and the database engine processes the query and its extents in conventional manner. If the query is "large," however, the list of extents is given to the query monitor and this process 150 continues. The query monitor thus receives extent lists from all queries meeting the "large" criteria.

In a step 164, the query monitor examines the scans and their extents currently executing. In FIG. 8 step 164 is shown occurring before its results are needed. However, in most embodiments it is expected that step 164 will be an ongoing, separate sub-process and that the query monitor will constantly be monitoring the contents of the buffer cache and the operations of the database engine.

In a step 166, the query monitor re-orders the list of extents for the present query, and possibly other queries as well, to cause the different queries at hand to be executed across the same extents at relatively the same time.

In a step 168, this process 150 is done with respect to changes initiated by the present query. Of course, in a complex DBMS many queries are present and this process 150 can be followed for each.

Recapping, consider a query one (Q1) that scans extends E1 through E100 and starts at time T1 and a query two (Q2) scans extends E1 through E100 and starts at time T2. Between T1 and T2, Q1 completes the scans of E1-E10 and let us accept that it is currently working on E11. The query monitor should then order the extends of Q2 to start with extent E11-E100 and then E1-E10.

It should be noted that exact timing is not necessary. Because pages live in the buffer cache for some amount of time, it is not necessary to have scans be in lockstep with each other. They should be able to take advantage of the fact that pages exists in the buffer cache for a short duration before being chosen as a victim for replacement. This can allow status information that flows between the scan and the query monitor to occur in a lazy, non-intrusive manner. FIG. 6 stylistically depicts this.

It can now be appreciated that this approach provides two notable advantages. It improves multi-stream query performance through better utilization of the buffer cache, and it permits the use of smaller buffer cache to free up memory for other operations.

The inventive approach does, however, have a key assumption associated with it. The extents to be read need to be ones that can be scanned in any order. This is true of many decision support queries that access large portions of a database. In fact, the TPC Benchmark(TM)H (TPC-H(TM)) performs many queries of this sort. TPC-H is one of a group of decision support benchmarks provided by the Transaction Processing Performance Council (TPC). In particular, TPC-H is currently the industry standard decision support benchmark for ad hoc queries. It well represents decision support environments where users do not know which particular queries will be executed against a database system; hence, the "ad-hoc" label. Without pre-knowledge of queries to optimize the DBMS system, execution times can be very long. TPC-H consists of a suite of business oriented ad-hoc queries and concurrent data modifications. The queries and the data populating the database have been chosen to have broad industry-wide relevance. This benchmark illustrates DSSs that examine large volumes of data, execute queries with a high degree of complexity, and give answers to critical business questions, i.e. sophisticated DBMSs suffering from the problems the present invention particularly addresses.

The inventors first identified the problem during TPC-H multi-stream testing of a major database engine. While this DB engine has superior single stream technology to other DB engines, it was observed to struggle with multi-stream queries. Other solutions were proposed. For example, to allow queries to snoop around searching for active scans and join to a scan that was accessing an extent that was common to both scans. But this approach was found wanting. Scans in the particular DB engine do not utilize the buffer pool. Therefore, in order to share scans between queries, a far greater amount of coordination is required, which raises the complexity of this solution to a cost prohibitive level. Also, nothing was done to order the extents of the scans to guarantee that the scans would be accessing the same extents at the same time. The ability to actually share a scan thus was still arbitrary.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

What we claim is:

1. A method for data base management, comprising the steps of:
   (a) receiving a plurality of queries with respect to data in at least one of a plurality of tables in a database, wherein each table occupies at least one extent;
   (b) reviewing each said query and determining a respective extents list of said extents containing said data needed by that said query;
   (c) re-ordering said extents lists based on an order calculated to be more efficient for execution of said queries;
   (d) loading said extents from said database as ordered in said extents lists into a buffer cache; and
   (e) executing said queries on said data in respective said extents in said buffer cache to determine respective results.

2. The method of claim 1, wherein:
said step (c) includes monitoring which said extents are presently in said buffer cache and re-ordering said extents lists so that at least some said extents already in said buffer cache are used more efficiently by said plurality of queries.

3. The method of claim 2, wherein:
said step (c) includes monitoring which said extents in said buffer cache some said queries are currently being executed against and re-ordering said extents lists so that at least some said extents already in said buffer cache are used more efficiently by other said queries.

4. The method of claim 1, wherein:
said step (c) includes re-ordering said extents lists so that some said queries are executed at least partially concurrently in said step (e) using at least one same said extent in said buffer cache.

5. The method of claim 1, wherein:
said step (c) includes re-ordering said extents lists so that some said queries are executed contiguously in said step (e) using at least one same said extent in said buffer cache.

6. The method of claim 1, wherein:
said step (a) includes queuing said plurality of queries into a query list; and said step (c) includes re-ordering said query list so that at least some said extents in said buffer cache are used more efficiently by said queries.

7. A system for data base management, comprising:

means for receiving a plurality of queries with respect to data in at least one of a plurality of tables in a database, wherein each table occupies at least one extent;

means for reviewing each said query and determining a respective extents list of said extents containing said data needed by that said query;

means for re-ordering said extents lists based on an order calculated to be more efficient for execution of said queries;

means for loading said extents from said database as ordered in said extents lists into a buffer cache; and means for executing said queries on said data in respective said extents in said buffer cache to determine respective results.

8. The system of claim 7, wherein:

said means for re-ordering includes means for monitoring which said extents are presently in said buffer cache and said means for re-ordering re-orders said extents lists so that at least some said extents already in said buffer cache are used more efficiently by said plurality of queries.

9. The system of claim 7, wherein:

said means for re-ordering includes means for monitoring which said extents in said buffer cache some said queries are currently being executed against and said means for re-ordering re-orders said extents lists so that at least some said extents already in said buffer cache are used more efficiently by other said queries.

10. The system of claim 7, wherein:

said means for re-ordering re-orders said extents lists so that some said queries are executed at least partially concurrently by said means for executing using at least one same said extent in said buffer cache.

11. The system of claim 7, wherein:

said means for re-ordering re-orders said extents lists so that some said queries are executed contiguously by said means for executing using at least one same said extent stored in said buffer cache.

12. The system of claim 7, wherein:

said means for receiving queues said plurality of queries into a query list; and said means for re-ordering re-orders said query list so that at least some said extents that are retrieved and stored in said buffer cache are used more efficiently by said queries.

13. A computer program, embodied on a computer readable storage medium, the computer program for executing in a computer having a database and comprising;

a code segment that receives a plurality of queries with respect to data in at least one of a plurality of tables in a database, wherein each table occupies at least one extent;

a code segment that reviews each said query and determines a respective extents list of said extents containing said data needed by that said query;

a code segment that re-orders said extents lists based on an order calculated to be more efficient for execution of said queries;

a code segment that loads said extents from said database as ordered in said extents lists into a buffer cache; and a code segment that executes said queries on said data in respective said extents in said buffer cache to determine respective results.

* * * * *